May 21, 1929.  H. W. ALDEN  1,714,290
WHEEL
Filed Nov. 14, 1927
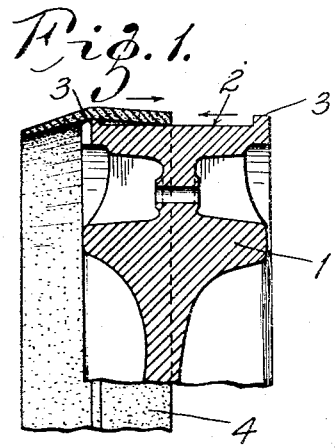
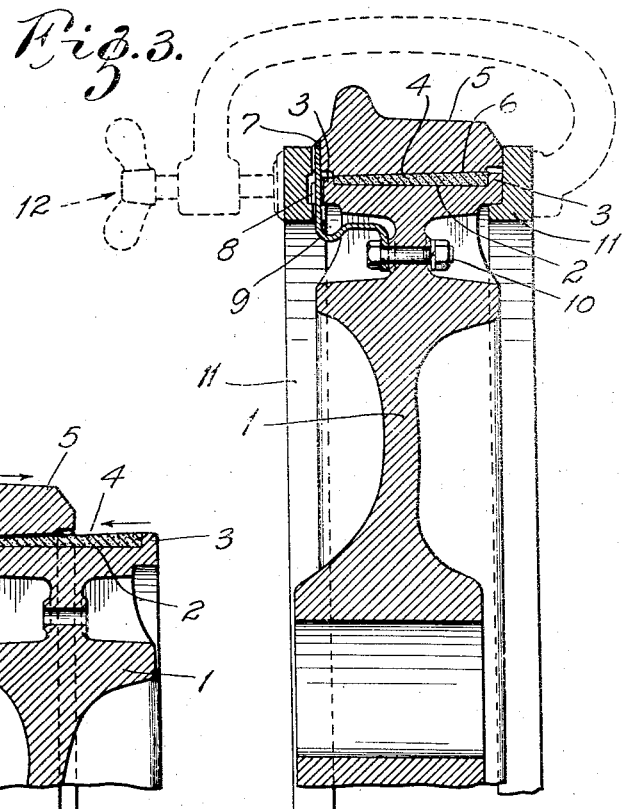
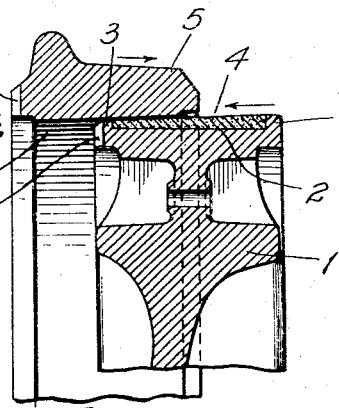
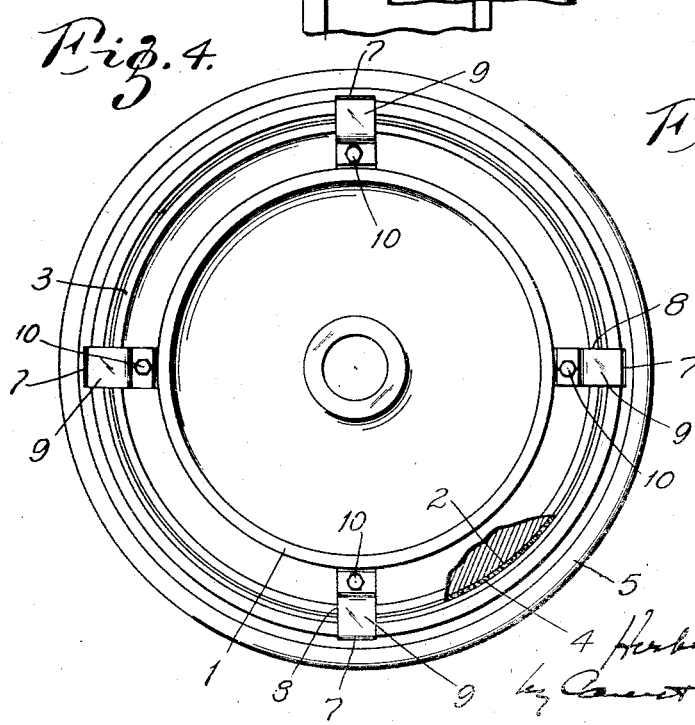
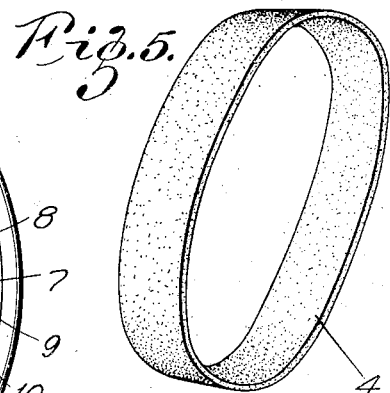
INVENTOR:
Herbert W. Alden
HIS ATTORNEYS Patented May 21, 1929.

1,714,290

UNITED STATES PATENT OFFICE.

HERBERT W. ALDEN, OF DETROIT, MICHIGAN, ASSIGNOR TO THE TIMKEN-DETROIT AXLE COMPANY, OF DETROIT, MICHIGAN, A CORPORATION OF OHIO.

WHEEL.

Application filed November 14, 1927. Serial No. 233,126.

My invention relates to wheels of the type wherein rubber or like insulating or sound deadening material is interposed between the hub member and the ring. Its principal objects are to produce a wheel of this type which will be simple and strong in construction and capable of being assembled accurately and economically. Another object is to devise a process for assembling such a wheel. The invention consists principally in a hub member provided with a circumferential channel into which is stretched a band of rubber or similar material and upon which band is mounted a rim member. It also consists in making such band of continuously increasing thickness from one margin thereof to the other to facilitate the mounting of a conically bored rim member thereon. It also consists in shrinking the rim member onto the insulating band. It also consists in the parts and combinations of parts and in the process hereinafter described and claimed.

In the accompanying drawing, wherein like numerals refer to like parts wherever they occur, Fig. 1 is a cross-sectional view of part of the hub member of my wheel with the insulating band being stretched onto the same;

Fig. 2 is a similar view with the insulating band in place on the hub member and showing the rim member being moved axially into position;

Fig. 3 is a similar view of the parts of the wheel assembled and with the clamping apparatus in place;

Fig. 4 is a side view of part of a completed wheel with a small portion of the hub member broken away; and Fig. 5 is a view of the insulating band.

The hub member 1 of the present construction has a channel-shaped periphery, that is, it has a cylindrical surface 2 bounded on both sides by circumferential ribs 3. In the channel thus formed is mounted a continuous band 4 of rubber or other suitable material, whose thickness increases continuously from one margin to the other so that, when the band is mounted in the cylindrical channel of the hub member, the outer surface of said band is conical. A rim member 5 is mounted on this band; and for this purpose, its bore or inner surface 6 is coned to correspond with the coning of the outer surface of said band. One face of the rim member has a series of radial notches 7 formed therein in register with radial notches 8 formed in one face of the hub member. The alined notches receive radially disposed clips 9 that are secured to the hub member by bolts 10 or other suitable means. The radial clips are preferably made of copper with their outer ends spot-welded to the rim member and bolted to the hub member so as to constitute electrical leads; and by reason of said leads lying in the radial notches, they are well protected from exposure to accidental injury.

The process of assembling the parts of the wheel is as follows: The peripheral length of the continuous band of insulating material, which is preferably rubber or other suitable elastic material, is normally shorter (or not appreciably longer) than the periphery of the cylindrical portion of the hub member; and in order to mount such band on said hub member, said band is stretched enough to be pulled over one of the marginal ribs of said hub member, whereupon it contracts and hugs the cylindrical surface of the hub member. The thin margin of the insulating band is of greater thickness than the radial thickness of the adjacent circumferential rib of the hub member. When the insulating band is thus mounted on the hub member and prior to the application of the rim member, the outer diameter of the insulating band at any point is greater than the diameter of the bore of the rim member at the point where it contacts with said first mentioned point when the parts are completely assembled. In order, therefore, to mount the rim member, it is necessary to heat and thereby expand it sufficiently to permit it to be moved axially of the insulating band. While it is still hot, suitable clamping apparatus is applied thereto and maintained until the rim member is cooled and thereby shrunk onto the insulating band. Suitable apparatus for this purpose is indicated in the drawing and comprises annular blocks or clamping rings 11 that are held together by suitable screw clamps 12. These rings are positioned opposite the margins of the insulating band and serve to prevent the escape of any of the insulating material that may be liquefied by the heat; and they also function as molds for any plastic material that may be squeezed out by the pressure due to the positioning and shrinking of the rim. The clips are preferably mounted in the radial notches as soon as the rim member is applied to the insulating band to insure the proper alinement of the notches of the rim member with those of the hub member.

By reason of the insulating band being stretched into the peripheral channel of the hub member, it is safely, simply and economically mounted on said hub member; and by reason of the rim member being shrunk onto said band, it has a very tight frictional engagement therewith and there can be no looseness between the hub member and the rim member. This method of mounting is very simple, strong and economical. While the primary function of the radial clips will usually be to serve as electrical leads, it is obvious that, in case the frictional engagement of the insulating band is insufficient, such clips will aid appreciably both in preventing axial displacement of the rim member relatively to the band and hub member and also in preventing circumferential slipping or displacement of said rim member relatively to said band and hub member.

While I have shown and described the insulating band as thicker along one margin than the other, it is obvious that the band may be of uniform thickness. In such case, the main peripheral surface of the hub member may be coned so that, when the insulating band is stretched onto it, the outer surface of the stretched band will be conical. While the coning of the band and of the bore of the rim member greatly facilitates the assembling of the parts, such coning is not necessary, as the band may be mounted with a cylindrical outer surface and the bore of the rim member made cylindrical to fit tightly thereon when shrunk in position. Likewise the circumferential ribs of the hub member need not be continuous but may be replaced with spaced lugs.

While I have designated rubber as a suitable material for the insulating band, it is obvious that other materials are also suitable. In practical use the principal functions of the insulating material are to deaden noise and to cushion or minimize shock and jar rather than to insulate electric currents and prevent the transfer of heat; and the term "insulating band" is to be understood as covering bands suitable for either of these functions, of whatever material such band may be made.

What I claim is:

1. A wheel comprising a hub member having a channel shaped periphery, a continuous band of insulating material mounted in the channel of said hub member and kept in position by the sides thereof, and a rim member frictionally mounted on said band, and means for mechanically locking said hub member and said rim member against relative circumferential displacement.

2. A wheel comprising a hub member, a band of insulating material mounted on the periphery thereof, and a rim member mounted on said band, said hub member and said rim member having radially alined notches, and clips resting in said notches and secured to said hub member.

3. A wheel comprising a hub member having a channel shaped periphery, a continuous band of insulating material mounted in the channel of said hub member and kept in position by the sides thereof, and a rim member frictionally mounted on said band, said hub member and said rim member having radially alined notches, and clips resting in said notches and secured to said hub member.

4. A wheel comprising a hub member, a band of insulating material mounted on the periphery thereof and having a conical outer surface, a rim member with a conical bore frictionally engaging said band, and clips secured to said hub member and overlapping the rim member at the end where the bore is of smallest diameter.

5. A wheel comprising a hub member, a band of insulating material of greater thickness at one margin than at the other mounted on the periphery of said hub member and having a conical outer surface, a rim member with a conical bore shrunk onto said band, and clips secured to said hub member and overlapping the rim member at the end where the bore is of smallest diameter.

6. The process of assembling insulated wheels which comprises stretching an elastic band of insulating material onto the periphery of a hub member, expanding by heat a rim member of slightly smaller bore than said band, placing said expanded rim member over said band, and permitting it to shrink thereon by cooling.

7. The process of assembling insulated wheels which comprises stretching onto the channel shaped periphery of a hub member an elastic band of insulating material with a conical outer surface, and forcing axially onto said band a rim member with a conical bore of slightly smaller size than the outer surface of said band.

8. The process of assembling insulated wheels which comprises stretching onto the channel shaped periphery of a hub member an elastic band of insulating material with a conical outer surface, and heating a rim member with a conical bore of slightly smaller size than said band surface to expand said rim member and then forcing said expanded rim member axially onto said band and permitting it to shrink thereon.

9. The process of assembling insulated wheels which comprises stretching onto the channel shaped periphery of a hub member an elastic band of insulating material with a conical outer surface, expanding by heat and forcing axially onto said band a rim member with a conical bore of slightly smaller size than the outer surface of said band, providing said hub and rim members with notches in radial alinement at the smaller end of said bore, mounting clips in said notches and securing them to the hub member, clamping said members together and permitting said rim member to cool while so clamped.

10. The process of assembling insulated wheels which comprises stretching onto the channel shaped periphery of a hub member an elastic band of insulated material with a conical outer surface, heating a rim member with a conical bore of slightly smaller size than said band surface to expand said rim member and then forcing said expanded rim member axially onto said band, clamping said members together, and permitting said rim member to shrink while so clamped.

Signed at Detroit, Michigan, this 10th day of November, 1927.

HERBERT W. ALDEN.